July 6, 1926.
C. A. PETERS
GARDEN TRACTOR
Filed May 2, 1924
1,591,928
6 Sheets-Sheet 1
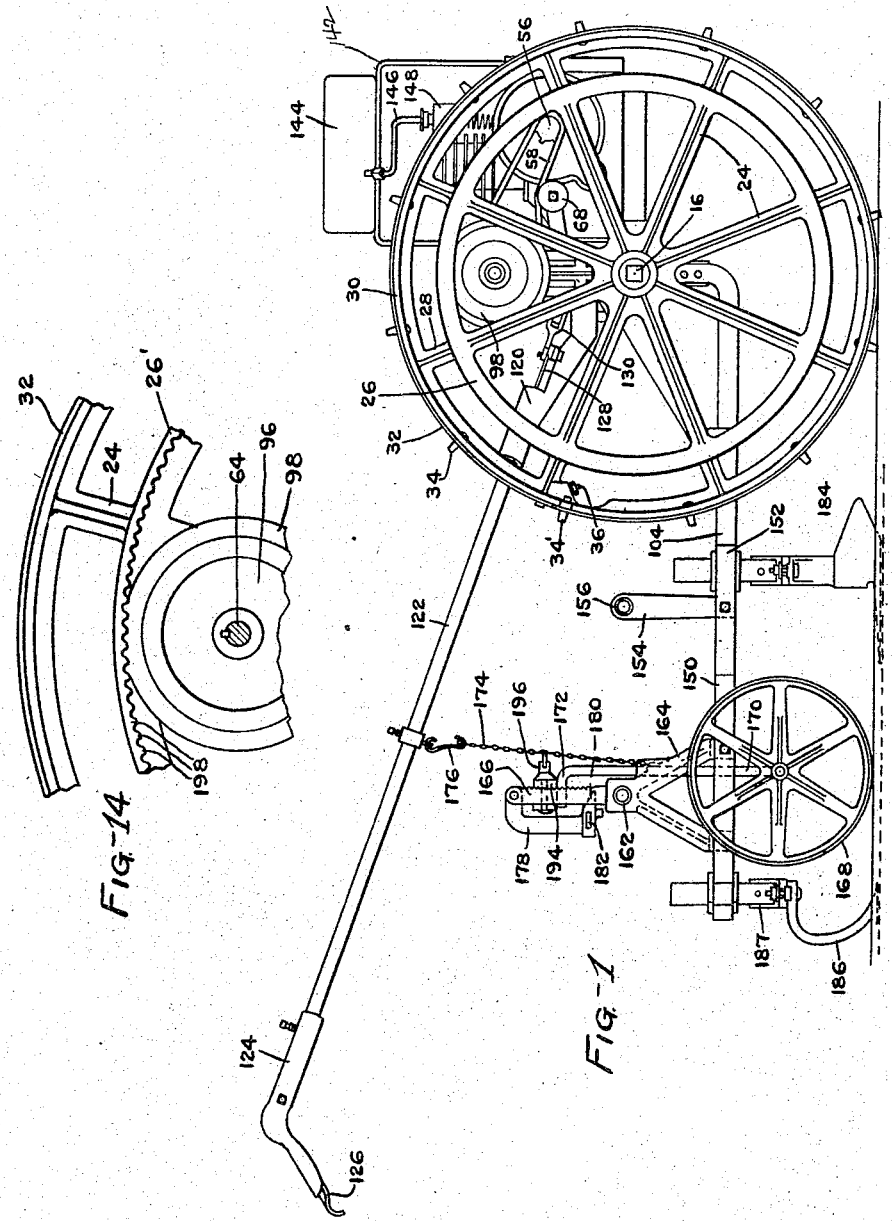
INVENTOR:
C. A. PETERS.
By Whiteley and Ruckman
ATTORNEYS.

July 6, 1926.
C. A. PETERS
1,591,928
GARDEN TRACTOR
Filed May 2, 1924
6 Sheets-Sheet 2
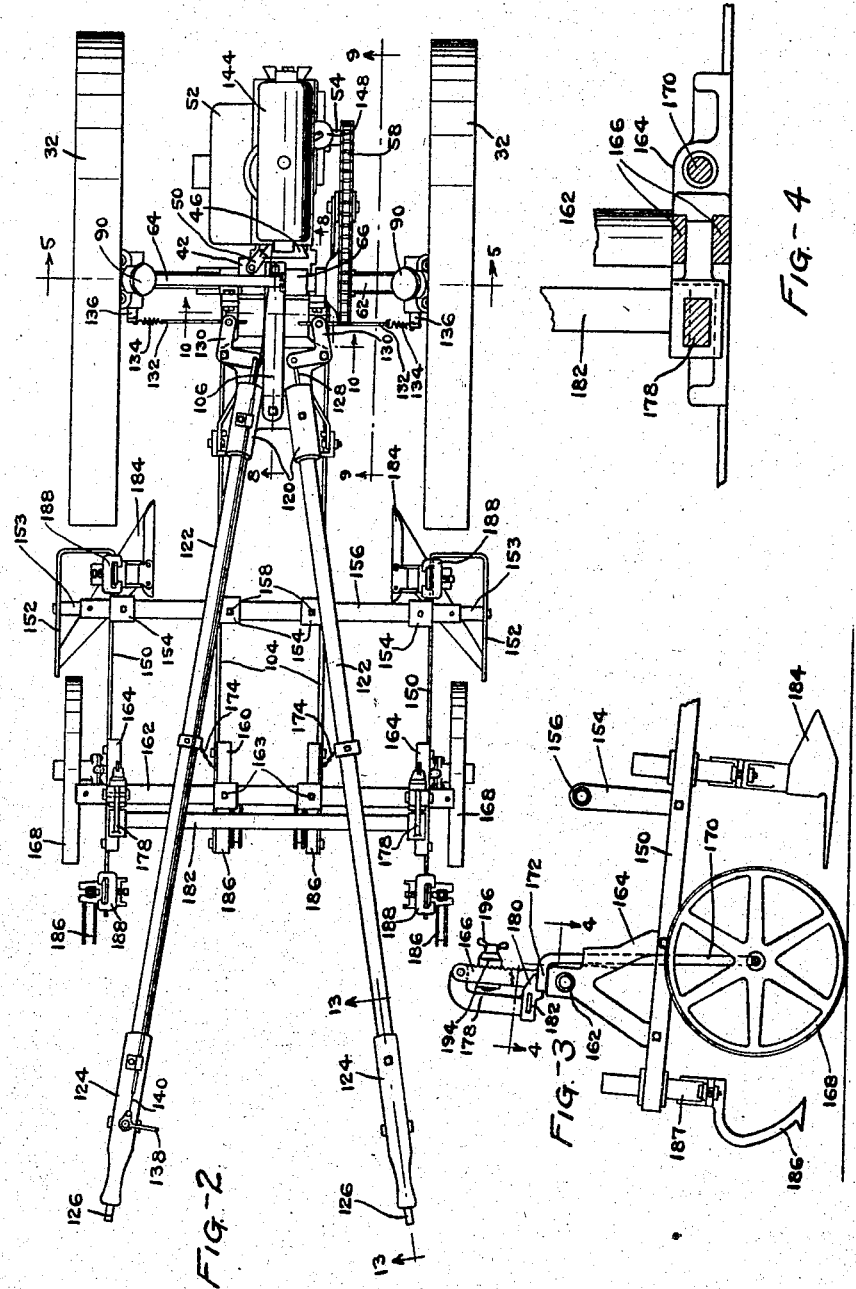
INVENTOR:
C. A. PETERS.
By Whiteley and Ruckman
ATTORNEYS

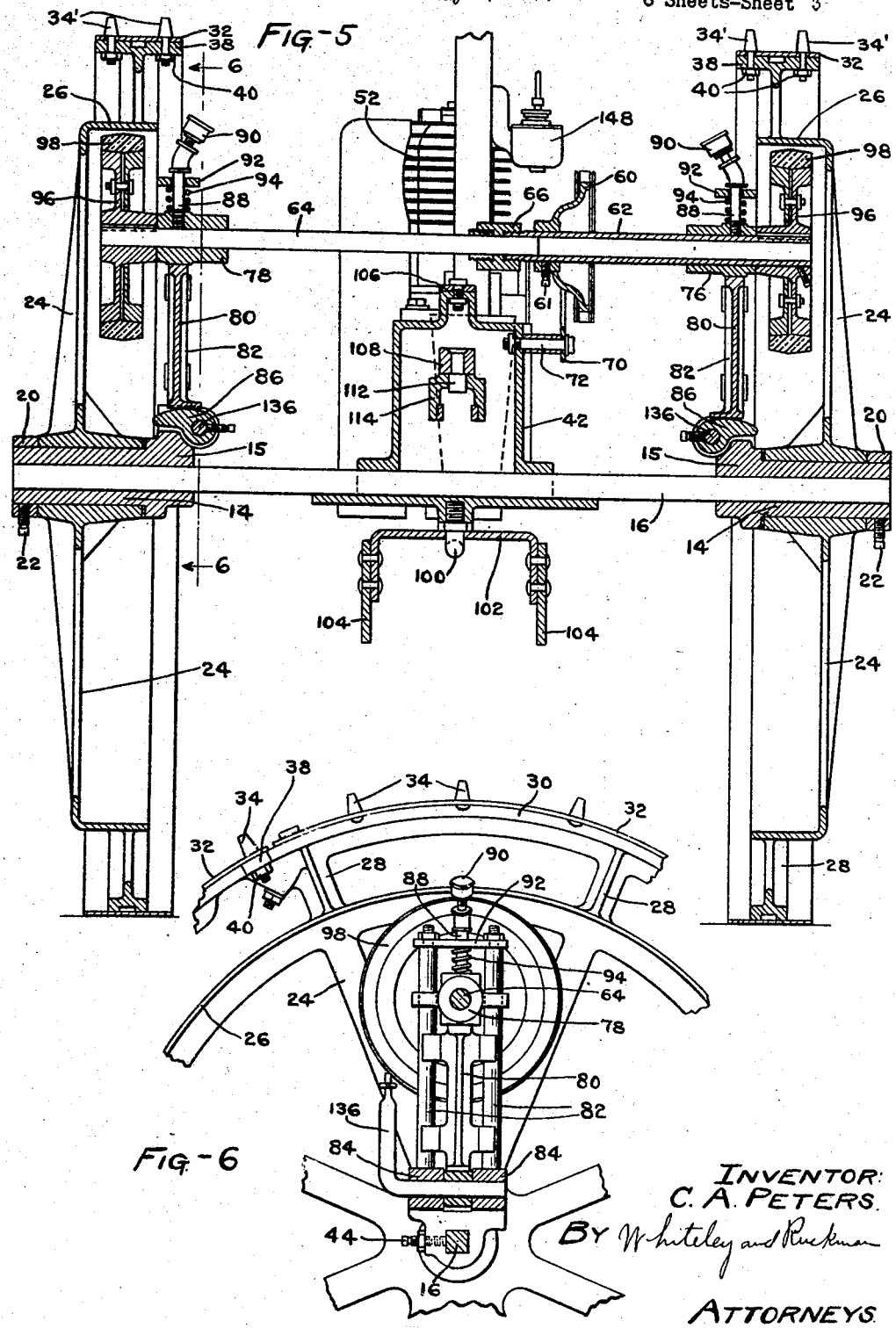

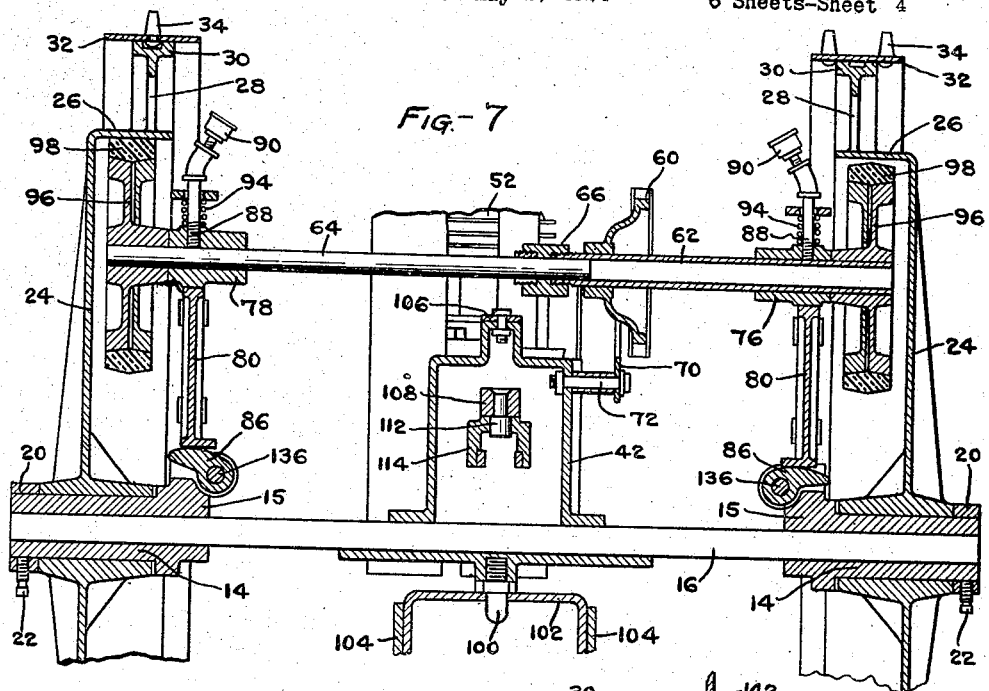
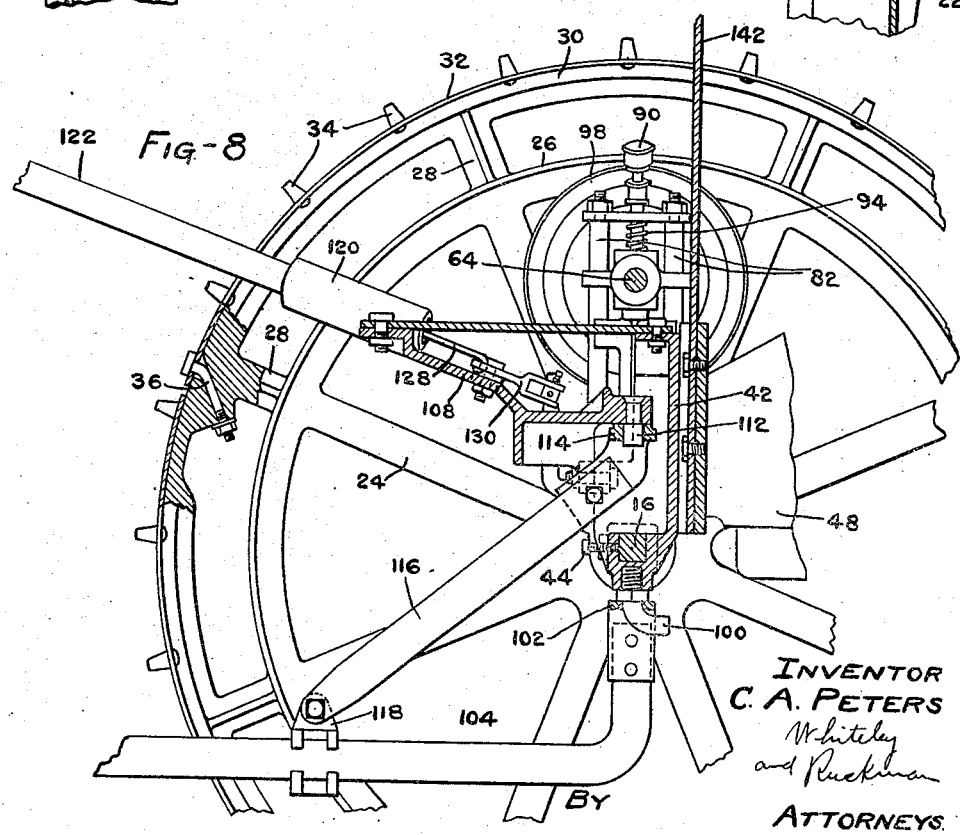

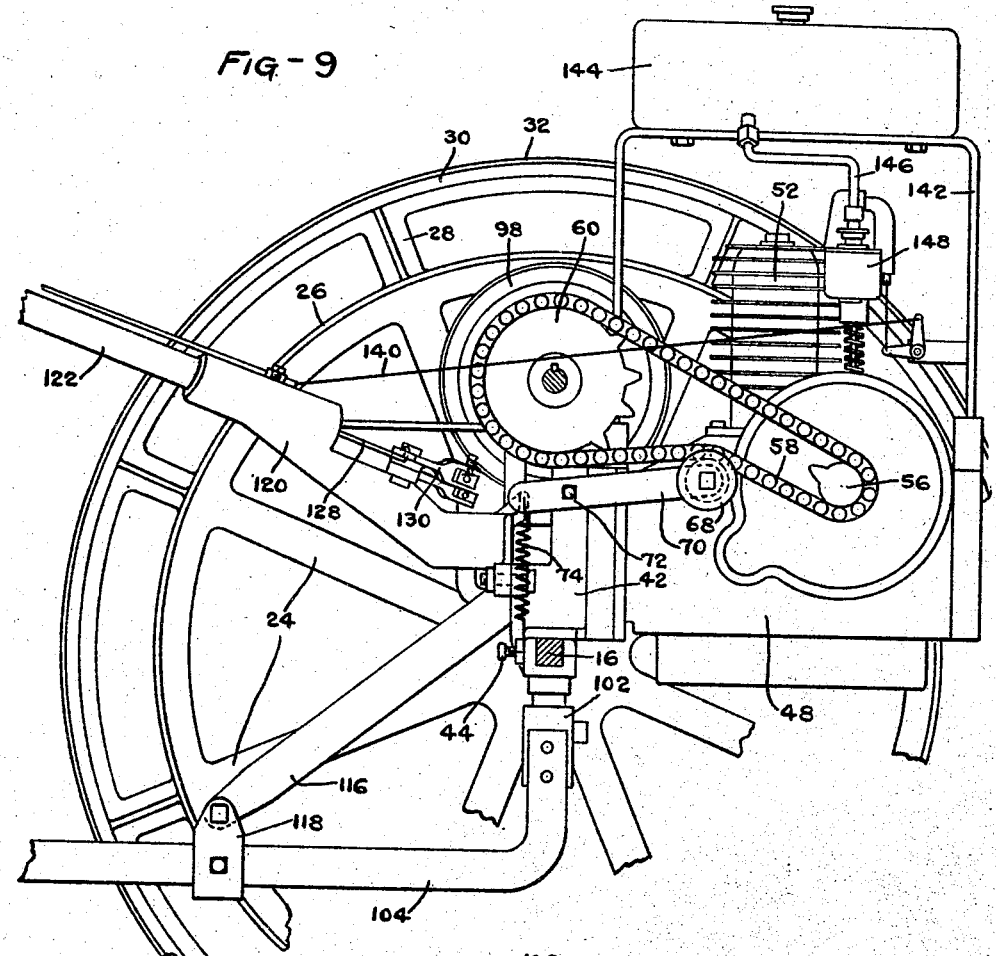
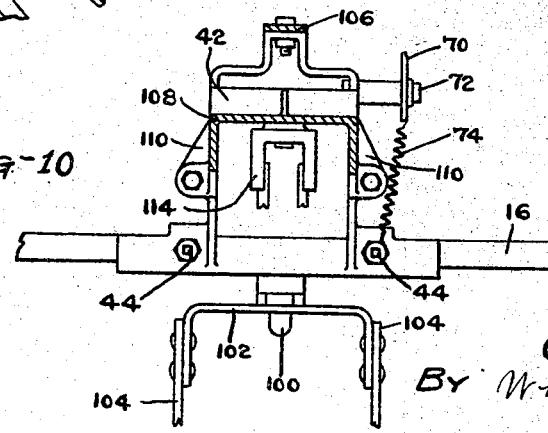

July 6, 1926.

C. A. PETERS 1,591,928

GARDEN TRACTOR

Filed May 2, 1924    6 Sheets-Sheet 6

INVENTOR
C. A. PETERS.
Whiteley and
Ruckman
BY ATTORNEYS.

Patented July 6, 1926.

1,591,928

UNITED STATES PATENT OFFICE.

CORNELIUS A. PETERS, OF MINNEAPOLIS, MINNESOTA.

GARDEN TRACTOR.

Application filed May 2, 1924. Serial No. 710,560.

My invention relates to garden tractors, and an object is to provide a machine of this character which is operated by a motor having driving connections with two traction or ground wheels, the arrangement being such that either one or both of these wheels can be quickly disengaged from and engaged with the driving connections. Another object is to provide a construction which permits the distance between the traction wheels to be readily varied and by means of which either one, two, or three rows of plants may be cultivated. Another object is to provide a construction which permits the motor which is preferably an internal combustion engine to be attached to and detached from a support carried by the machine. Another object is to provide a construction by means of which the cultivator frame or implement frame may be held up from the ground when the tractor is being driven to the place which is to be worked. Another object is to provide a construction whereby the implement frame may be quickly attached to and detached from a support carried by the machine and whereby the inclination of the implement frame with relation to said support may be varied. Another object is to provide a garden tractor having traction wheels engageable with the interior surfaces of said flanges for driving purposes whereby mud and dirt is not liable to accumulate between the flanges and friction wheels. Other objects are to provide a garden tractor which is easy and economical to manufacture, efficient in operation and of sufficient light weight so that it can be readily steered and manipulated for use by the smaller farmer and truck gardeners.

The full objects and advantages of my invention will appear in connection with the detailed description, and the novel features of my inventive idea will be particularly pointed out in the claims.

Figure 11:
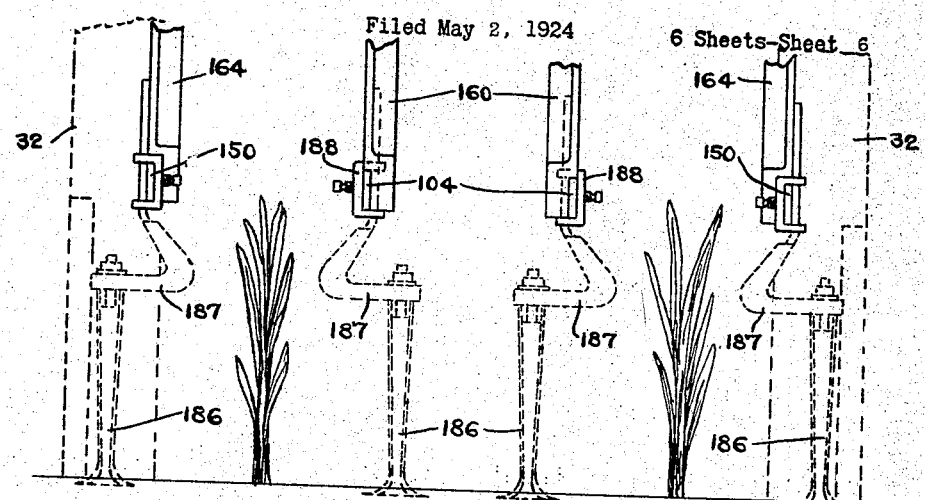
Figure 12:
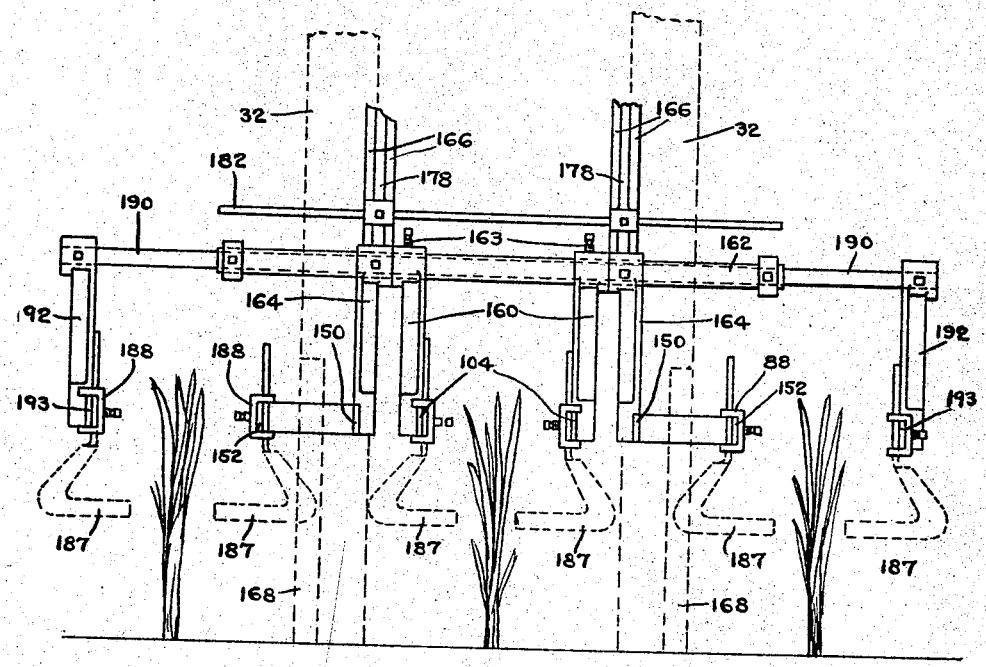
Figure 13:
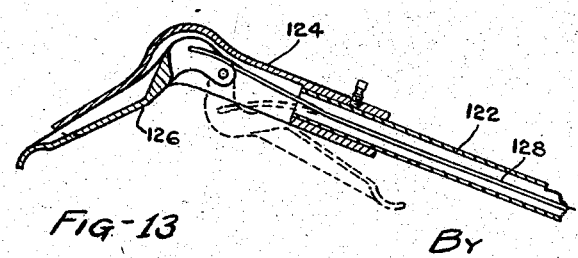

In the accompanying drawings which illustrate a practical embodiment of my invention, Fig. 1 is a side elevational view of the tractor. Fig. 2 is a top plan view. Fig. 3 is a fragmentary view showing the construction for holding the cultivator teeth up from the ground. Fig. 4 is a view in horizontal section on the line 4—4 of Fig. 3. Fig. 5 is a view in vertical section on the line 5—5 of Fig. 2. Fig. 6 is a view in vertical section on the line 6—6 of Fig. 5. Fig. 7 is a view corresponding to Fig. 5 but showing one side of the machine in driving position. Fig. 8 is a view in vertical section on the line 8—8 of Fig. 2. Fig. 9 is a view in vertical section on the line 9—9 of Fig. 2. Fig. 10 is a view in vertical section on the line 10—10 of Fig. 2. Fig. 11 is a detail view showing the machine set for cultivating two rows of plants. Fig. 12 is a detail view showing the machine set for cultivating three rows of plants. Fig. 13 is a fragmentary view in section on the line 13—13 of Fig. 2. Fig. 14 (Sheet 1) is a fragmentary view of a slight modification.

Referring to the particular construction shown in the drawings, two traction wheels are rotatably mounted on sleeve portions 14 of castings 15 held upon the two ends of a square stationary shaft 16 by set screws 18 as shown in Fig. 6. The hubs of the traction wheels are held on the sleeve portions 14 by collars 20 provided with set screws 22. The traction wheels are preferably made as castings and have spoke members 24 which connect the hubs with the driving flanges 26. Spaced concentrically around the flanges 26 and connected thereto by spoke members 28 are wheel rims 30 having the cross-sectional shape shown in Figs. 5 and 7. Secured upon the rims 30 are bands 32 which preferably carry calks 34. As shown at the upper left hand portion of Fig. 7 some of the headed ends of the calks engage in a peripheral groove contained in the rims 30 and as shown at the upper right hand portion of this figure some of the headed ends of the calks engage the outer edges of the rims so that crosswise movement of the bands on the rims is prevented. As will be apparent from Fig. 8, the bands 32 are split crosswise and secured at one end by bolts 36 which pass through enlargements on the rims. As will be apparent from Figs. 5 and 6, the other end of the bands 22 is secured by calks 34' having stems passing through ears 38 and secured by nuts 40. An angular support 42 is secured to the middle portion of the shaft 16 by set screws 44. The front of the support 42 is provided with a vertical dovetailed groove which receives a corresponding projection 46 formed on a motor base 48, the projection 36 when slid into the groove being secured therein by a latch 50 so that the motor base and the motor carried thereby may be readily removed. The motor consists of an internal combustion engine 52 having an engine shaft 54 to which is secured a sprocket wheel 56 connected by a sprocket chain 58 to a sprocket wheel 60 secured by a set screw 61 to a hollow shaft member 62 which telescopically receives a solid shaft member 64. The two shaft members are secured together in adjusted position by a locking nut 66 and it will be understood that upon loosening this nut the shaft members may be telescoped more or less as desired and that the sprocket wheel 60 may be secured in proper place by the set screw 61. In order to keep the chain 58 tight, the understretch thereof is engaged by a roller 68 mounted on one end of a lever 70 which is intermediately pivoted on a bolt 72 secured to support 42. The other end of the lever 70 is connected by a spring 74 to one of the bolts 44. The outer ends of the shaft members 62 and 64 are mounted in similar bearings 76 and 78 carried by the upper ends of slides 80 mounted for sliding movement on pairs of vertical rods 82 extending up from ears 84 carried by the castings 15. The lower ends of the slides 80 rest upon cams 86 which will be referred to later. Secured to openings in the upper sides of the bearings 76 and 78 are tubes 88 which at their upper ends are provided with grease cups 90. The tubes 88 extend slidably through cross bars 92. Springs 94 which surround the tubes 88 are interposed between the cross bars 92 and the bearings just referred to so that these slides are maintained in engagement with the cams 86. Secured to the ends of the shaft members 62 and 64 are friction drive wheels 96 which are provided with rubber tires or treads 98. An implement carrying frame is attached to the support 42 by means now to be described. Extending down from the support 42 is a forwardly curved lug 100 best shown in Fig. 8 and upon which the central portion of a yoke 102 is adapted to be hooked. Attached to the ears of the yoke 102 are a pair of rearwardly extending implement frame members 104. Extending rearwardly from the top of the support 42 is a plate 106 to which is bolted a casting 108 which is also bolted to ears 110 formed on the support 42 as will be apparent from Fig. 10. The casting 108 is provided with a downwardly extending lug 112 while a yoke 114 is provided with a central hole so that the yoke is adapted to slidably engage the lug 112. The upper ends of brace rods 116 are secured to the ends of the yoke 114 and the lower ends of these brace rods carry pivotally attached slides 118 which are adjustably attached to the frame member 104 as will be understood from Figs. 8 and 9. It will be apparent from this construction that the inclination of the members 104 relatively to the support 42 may be readily varied and that the implement frame may be readily attached when the support 42 is tilted upwardly. Extending rearwardly from the casting 108 are a pair of socket members 120 which receive the forward ends of the hollow handles 122 having hand engageable members 124 secured to the rear ends as best shown in Fig. 13.

Pivotally attached to the members 124 are levers 126 to which the rear ends of rods 128 are secured. These rods extend through the hollow handles 122 and their forward ends are attached to one end of bell cranks 130 to the other end of which rods 132 are attached. The outer ends of the rods 132 are connected by springs 134 to the vertical portions of cranks 136 whose horizontal portions are rotatably mounted in the ears 84 as shown in Fig. 6. The cams 86 are secured to the crank portions 136. It is evident that when the levers 126 are pulled from the dotted line position shown in Fig. 13 into the full line position therein shown, that the cams 86 will be turned upwardly and the rubber tires 98 of the friction wheels will engage the inner surface of the flanges 26 as shown at the left in Fig. 7 so that the traction wheels will be driven when the engine is running. It will be apparent from Fig. 7 that when one of the friction wheels is released, the tractor will be quickly turned so that it may be made to travel in the opposite direction. As shown in Fig. 2, one of the hand engageable members 24 is provided with a lever 138 which is connected by a wire 140 with the engine for controlling the supply of gas thereto. A sheet metal angular support 142 carried by the base of the engine has an upper horizontal portion upon which is secured a fuel oil tank 144 connected by a supply pipe 146 with the engine carbureter 148. Arranged parallel with and outside of the rear portion of the frame members 104 are two frame members 150 whose forward portions are bent outwardly at right angles and then again backwardly at right angles to form the two short portions 152 which as shown in Fig. 2 are secured to the main portions of the members 150 by braces 153. Extending upwardly from the pair of frame members 104 and the pair of frame members 150 are four standards 154 having openings in their upper ends through which a tube 156 passes, being secured therein by set screws 158. Extending upwardly from the rear of the pair of frame members 104 as best shown in Fig. 12 are two standards 160 having openings in their upper ends through which a tube 162 passes. Extending upwardly from the rear of the pair of frame members 150 are two standards 164 having openings which receive the tube 162 which is secured by set screws 163. The standards 160 and 164 are of inverted V-shape as shown in Fig. 1 but the outer standards 164 are continued upwardly to form a pair of rack members 166 slightly spaced from each other as best shown in Fig. 12. Trailer wheels 168 are rotatably mounted on the horizontally bent lower ends of vertical rods 170. These vertical rods extend slidably through vertical openings in the standards 164 as will be apparent from Fig. 4, and the upper ends of the rods have backwardly bent portions 172 which fit slidably between the pairs of rack members 166 whereby the rods are prevented from turning. The lower ends of two chains 174 are secured to the standards 160. The upper ends of these chains are attached to hooks 176 carried by the handle members 122 so that the handle members may have a certain amount of sidewise movement without pulling upon the implement frame. The upper ends of dogs 178 are pivotally attached to the upper ends of the rack members 166. The lower ends of these dogs have offset portions provided with upper inclined surfaces 180 which fit the two pairs of rack members 166 and are normally below the bent rod ends 172 as will be apparent from Fig. 1. When the handle members 122 are jerked upwardly the implement frame on account of its attachment to the handle members by the chains 174 is moved upwardly into the position shown in Fig. 3 with the dogs 178 resting upon the bent rod ends 172 so that the cultivator teeth are held up from the ground when the tractor is being driven to the place where it is to be operated. The two dogs 178 are connected by a bar 182 which may be engaged by the foot of the operator and pulled backwardly to release the dogs and permit the implement frame to descend into working position. Ground-working implements 184 are shown secured to the forward portions of the frame members 150 while ground-working implements 186 of another form or which may be ordinary cultivator teeth are shown secured to rear ends of the frame members 104 and 150. The shank members 187 of these implements are readily attached by means of clamps 188. For cultivating a single row of plants, the tractor wheels 32 are shoved toward each other as shown in Fig. 12, this movement being readily permitted when the locking device 66 is loosened so that the shaft portions 62 and 64 may be more fully telescoped. In this case, cultivator teeth are attached only to the middle shank members 187. On account of the fact that the standards 154 and 164 are slidable on the tubes 156 and 162 being held in place only by set screws, these standards may be moved inwardly so as to bring the trailer wheels 168 directly behind the traction wheels as shown in Fig. 12. In order to cultivate three rows at one time, cultivator teeth are attached to the shanks 187 carried by the frame portions 152 and at the same time rods 190 carrying standards 192 connected by frame bars 193 are slid into the ends of the tubes 156 and 162, these rods being secured by set screws. Shank members 187 for holding implements are carried by bars 193 as shown in Fig. 12. In order to cultivate two rows, the traction wheels are separated from each other and the trailer wheels are also separated from each other, as shown in Fig. 11 and cultivator teeth 186 are arranged to operate in the manner shown in this figure. Toothed members 194 are held in adjustable engagement with the racks 166 by wing nuts 196. By referring to Fig. 1 it will be seen that the distance of the implement frame above the ground may be varied by changing the position of the members 194. When one of the trailer wheels 168 travels in a furrow or upon a ridge, the two members 194 may be set at different heights so that the implement frame will be kept level.

The operation and advantages of my invention will be apparent from the foregoing description. The tractor is propelled along the ground by the motor and is easily manipulated and steered by the operator who walks at the rear and grasps the hand engageable members 124 so that the two levers 126 and the lever 138 are within easy reach. When the operator moves either of the two levers 126 into the dotted line position shown in Fig. 13, the corresponding friction wheel will be removed from engagement with the driving flange 26 on the traction wheel and the machine will turn on this traction wheel as a center. It is evident that the machine can be turned in either direction to any desired extent in this manner and can be turned so as to start back in the opposite direction when the end of a row is reached. The rubber tires of the friction wheels are held resiliently engaged with the flanges 26 on account of the interposition of the springs 134 in the connections which operate the cams 86. By referring to Fig. 2 it will be understood that the tension of these springs may be varied and that the springs may be so set that the friction wheels will slip before the machine will be broken upon encountering an obstruction. It will be understood further that when both levers 126 are placed in the dotted line position of Fig. 13, the propulsion of the tractor will be stopped without stopping the motor. When the latter condition exists, the machine may be readily pulled backwardly by hand. It will be noted from Fig. 8 that the draw bar connection of the implement frame members 104 with the main support 42 is a central pivotal connection which lies in a common vertical plane with the shaft 16 which connects the traction wheels. Therefore, the traction wheels may be manipulated for steering purposes, and since the pull on the cultivator frame is in a forward direction, there will be only a slight tendency to impart sidewise movement to the implement frame. The chain connections between the handle members and the implement frame permit sufficient movement of the handle members for steering purposes without interfering with the forward pull on the implement frame. By referring to Fig. 9, it will be apparent that the lower stretch of the sprocket chain 58 is held up by the roller 68 with yielding pressure so that the chain may be readily disengaged from the sprocket wheel 56 to permit removal of the motor when the catch 50 shown in Fig. 2 is turned so that the dovetailed lug 46 carried by the motor may be slid upwardly in the dovetailed groove formed in the support 42. In the modification shown in Fig. 14, the driving flange 26' instead of being smooth is provided with teeth 198 which depress the rubber rim 98 so that the flange and the rubber rim in effect have interengaging teeth. At the same time, the rubber will yield and permit slippage in case too great resistance to forward movement of the tractor is encountered.

I claim:

1. A garden tractor comprising a support, traction wheels upon which said support is mounted, a motor carried by said support, driving connections between said motor and said traction wheels, an implement frame having a pair of side frame members, means for attaching said implement frame to said support, a pair of brace rods connected at their forward ends to said support, and means for adjustably securing the rear ends of said brace rods to said side frame members whereby the inclination of said frame relatively to said support may be varied.

2. A garden tractor comprising a support, traction wheels upon which said support is mounted, a motor carried by said support, driving connections between said motor and said traction wheels, a lug extending downwardly and forwardly from the bottom of said support, an implement frame having a pair of side frame members connected at their forward ends by a yoke member provided with a central opening in which said lug engages, an upper lug extending downwardly from said support, a pair of brace rods, a yoke member connecting the forward ends of said brace rods and having a central opening in which said upper lug engages, and means for adjustably securing the rear ends of said brace rods to said side frame members whereby the inclination of said frame relatively to said support may be varied.

3. A garden tractor comprising a support, traction wheels upon which said support is mounted, a motor carried by said support, driving connections between said motor and said traction wheels, an implement frame attached to said support, a pair of handle members extending rearwardly from said support, flexible members connecting said implement frame and said handle members whereby lifting of the latter will raise said frame to bring the implements carried thereby above the ground, trailer wheels with relation to which the rear of said frame is mounted for vertical movement, and releasable means for holding said frame in raised position.

4. A garden tractor comprising a support, traction wheels upon which said support is mounted, a motor carried by said support, driving connections between said motor and said traction wheels, an implement frame attached to said support, a pair of handle members extending rearwardly from said support, flexible members connecting said implement frame and said handle members whereby lifting of the latter will raise said frame to bring the implements carried thereby above the ground, a pair of vertical rods extending slidably through the rear portion of said frame, trailer wheels carried by the lower ends of said rods, said rods having rearwardly bent upper ends, spaced members extending up from said frame and between which said bent ends are slidably positioned, and dogs pivotally attached to the upper ends of said spaced members, said dogs having engaging portions normally located below said bent ends and adapted to rest upon the tops of said bent ends when said frame is in its raised position.

5. A garden tractor comprising a support, traction wheels upon which said support is mounted, a motor carried by said support, driving connections between said motor and said traction wheels, an implement frame attached by a vertical pivot to said support, a pair of handle members extending rearwardly from said support, a pair of vertical rods extending slidably through the rear portion of said frame, trailer wheels carried by the lower ends of said rods, said rods having rearwardly bent upper ends, spaced members extending up from said frame and between which said bent ends are slidably positioned, stop members carried by said spaced members and adapted to rest upon the upper sides of said bent ends, and means whereby the position of said stop members may be independently adjusted for maintaining said frame level.

In testimony whereof I hereunto affix my signature.

CORNELIUS A. PETERS.